(No Model.)
E. H. MIDDLETON.
SCREW JACK.
No. 292,567. Patented Jan. 29, 1884.
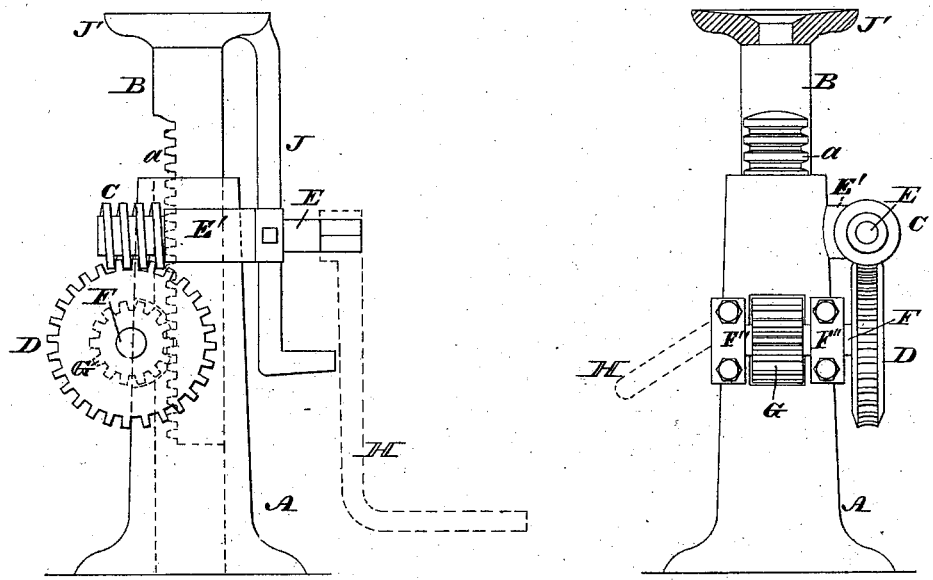
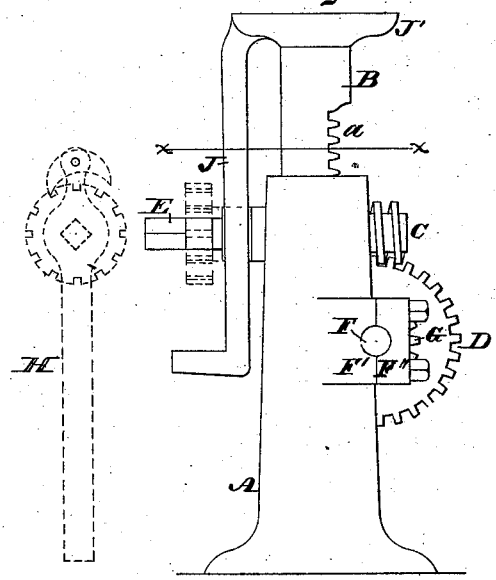
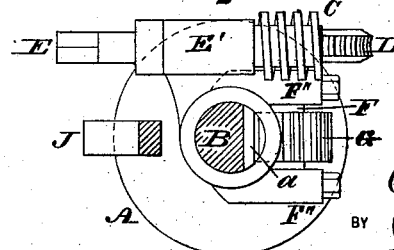
WITNESSES:
A. P. Grant
H. F. Kircher
INVENTOR:
Edward H. Middleton
BY John A. Wiedersheim
ATTORNEY.

United States Patent Office.

EDWARD H. MIDDLETON, OF PHILADELPHIA, PENNSYLVANIA.

SCREW-JACK.

SPECIFICATION forming part of Letters Patent No. 292,567, dated January 29, 1884.

Application filed May 7, 1883. (No model.)

*To all whom it may concern:*

Be it known that I, EDWARD H. MIDDLETON, a citizen of the United States, residing in the city and county of Philadelphia, State of Pennsylvania, have invented a new and useful Improvement in Screw-Jacks, which improvement is fully set forth in the following specification and accompanying drawings, in which—

Figures 1, 2, and 3 are side elevations of a screw-jack embodying my invention. Fig. 4 is a horizontal section thereof in line $x\ x$, Fig. 3.

Similar letters of reference indicate corresponding parts in the several figures.

My invention relates to improvements in a screw-jack in which the lifting-bar is operated by a worm and worm-wheel, whereby said bar is moved with great power and uniformity and other advantages will be presented, as hereinafter set forth.

Referring to the drawings, A represents the box or stand of the jack, and B the lifting-bar thereof, one side of said bar being toothed, constituting a rack, as at $a$. On the outer side of the stand is mounted a worm, C, which engages with a worm-wheel, D, likewise mounted on the stand, it being noticed that the shafts E F of the worm and worm-wheel extend at a right angle to each other, the shaft E being mounted on a boss, E', cast with the stand, and the shaft F being mounted on bearings F' F'', the bearing F' being cast with the stand, and the bearing F'' being bolted to said fixed bearing F'.

To the shaft F of the worm-wheel is keyed or otherwise secured a pinion, G, which enters an opening in the stand A, and engages with the teeth of the rack portion of the bar B. The shaft E of the worm is squared for the engagement of a crank-handle, H, so that by the operation of the latter said worm is rotated, the effect whereof is the rotation of the worm-wheel and pinion, which in one direction raises the bar B, and in the other direction lowers the same.

In lieu of a crank-handle, I may employ a lever provided with a pawl or dog, and connect with the shaft E a ratchet, so that the latter may be operated where it is inconvenient to employ a crank-handle.

It will be seen that by means of the worm and worm-wheel, when the jack is in service, considerable power may be imparted to the pinion G and exerted on the bar B, whereby the load may be raised with ease, the operation being uniform, avoiding abruptness and the liability to break the teeth of the different gearing. Furthermore, the pinion is prevented from rotating in reverse order, so that the load cannot cause the bar to descend, unless the handle or lever is properly turned; and in all cases the operation of the jack is comparatively noiseless. Again, the bearings of the shafts are outside of the stand, so that the worm, worm-wheel, and pinion and the shafts thereof may be readily applied in position, lubricated, and removed, when required, the parts shown bolted to the stand being the small bearing-pieces F'', the other bearings, F'' E', being cast solid with the stand, thus making a strong and simple screw-jack, and reducing expense in the manufacture of the same.

In cases when the collar J' is too high for taking hold of objects, a foot-lift, J, is provided, the same having its horizontal part at or near the bottom of the stand when the lifting-bar is at its lowest position, said foot being connected with said bar so as to rise and fall therewith. In order to permit said foot-lift J to be moved around the stand, it is connected with the swiveled collar J' at the top of the rack-bar, as most plainly shown in Fig. 3.

Having thus described my invention, what I claim as new, and desire to secure by Letters Patent, is—

1. The stand, in combination with a rack-bar, B, pinion G, a worm, C, a worm-wheel, D, and shafts E F, said stand having cast with it a horizontal boss, E', and bearing F', and provided with a removable bearing, F'', the pinion and worm-wheel being fixed to the same shaft, F, and both shafts E F being mounted outside of the stand, substantially as and for the purpose set forth.

2. A screw-jack consisting of the stand A, with boss E', and bearing F', cast therewith, the removable bearing F'', the lifting rack-bar B', the pinion G, the worm C, the worm-wheel D, the shafts E F, and a foot-lift connected with said bar, substantially as and for the purpose set forth.

3. In a screw-jack, a swiveled collar on the lifting-bar, in combination with a foot-lift depending from and secured to said collar, and adapted to be moved around the stand, substantially as and for the purpose set forth.

EDWARD H. MIDDLETON.

Witnesses:
  JOHN SHALLCROSS,
  GEORGE HUNTEN.